United States Patent Office 3,636,012
Patented Jan. 18, 1972

3,636,012
17α-(3'-HYDROXYPROPYNYL)-SUBSTITUTED
STEROIDS
Sandor Barcza, West Orange, N.J., assignor to
Sandoz-Wander, Inc., Hanover, N.J.
No Drawing. Filed June 16, 1969, Ser. No. 833,796
Int. Cl. C07c *169/20*
U.S. Cl. 260—397.4                                    6 Claims

ABSTRACT OF THE DISCLOSURE

The compounds are 13-alkyl-17β-hydroxy-17α-(3'-hydroxypropynyl)-3-oxo-gonanes having either 4- or 5(10) unsaturation, e.g., 17β-hydroxy-17α-(3'-hydroxypropynyl)-estra-4-en-3-one, and are useful as pharmaceuticals.

---

This invention relates to steroidal compounds, and more particularly to 13 - alkyl-17β-hydroxy-17α-(3'-hydroxypropynyl)-gonane derivatives and to their preparation as well as to intermediates in the preparation thereof.

The compounds of this invention may be conveniently represented by the Formula I

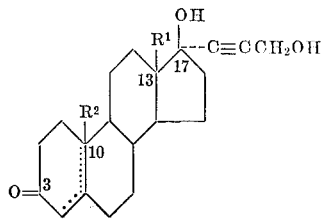

I wherein the dotted lines indicate a double bond linking either the 4 and 5, or the 5 and 10 positions,
$R^1$ is alkyl having from 1 to 3 carbon atoms, i.e. methyl, ethyl, propyl or isopropyl; and
$R^2$ is a hydrogen atom when the 4 and 5 positions are joined by a double bond.

Compounds I include compounds of classes Ia and Ib:

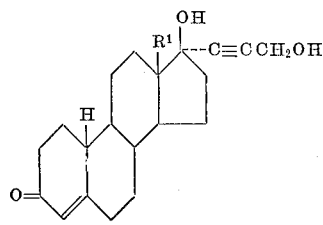

Ia wherein $R^1$ is as defined above; and

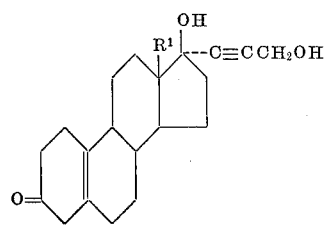

Ib wherein $R^1$ is as defined above.

Compounds I are obtainable by acid cleavage of a suitable 3-lower alkoxy-17β-hydroxy - 17α - (3'-hydroxypropynyl)-substituted gonane derivative, i.e. a compound II

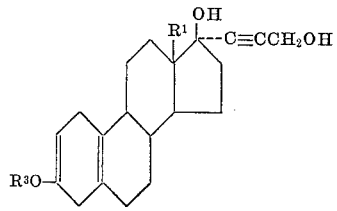

II wherein $R^3$ is lower alkyl, e.g., having from 1 to 4 carbon atoms, e.g., methyl, ethyl, propyl or butyl, and is preferably unbranched; and $R^1$ is as defined above.

Depending upon whether vigorous acid cleavage (step *b*) of a compound II, or mild acid cleavage (step *a*) thereof is employed, either a compound Ia or a compound Ib will be obtained. In addition, a compound Ib may be converted to its corresponding compound Ia (step *c*); said reaction steps are further described below.

The above-mentioned preparations of compounds Ia and Ib are conveniently represented by Reaction Scheme A, below, wherein only the A-rings of the compounds are shown (as this is the portion of the molecule on which the reaction occurs) $R^3$ being as defined above.

Reaction Scheme A

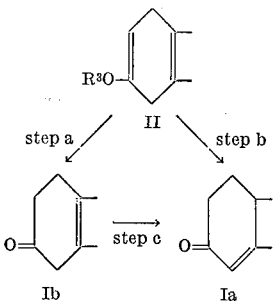

Referring to the above Reaction Scheme A:

Step a is a mild cleavage, effected, preferably, with oxalic acid, acetic acid or generally in acid media with pH value above 2 and preferably between 3 and 5, and preferably for a period of less than about 3 hours.

Step b is a more vigorous cleavage, effected, e.g., with oxalic acid or hydrochloric acid, at a pH value lower than that of step a and preferably between 1 and 2.

Step c may be carried out under the same conditions as are described for step b, or can be effected by prolonged treatment of a compound Ib, e.g., for a period longer than about 3 hours, under the conditions described for step a.

Any of steps a, b and c may be carried out at temperatures from, e.g., 0° to 50° C., if desired in the presence of suitable inert organic solvent, such as a lower alkanol, e.g., methanol, when mineral acid is employed; however, where the acid reactant is liquid it may be employed in excess to serve as solvent, e.g., acetic acid. Preferably, steps a, b and c are carried out in the presence of water.

If desired steps a and c may be combined so that a compound II is converted to its corresponding compound Ia without recovery of any intermediate compound Ib.

Compounds II may be obtained by reacting (step 1) a metallotrialkylsilyl ether of propargyl alcohol (a compound III) with a suitable 3-alkoxy-gon-17-one derivative (compound IV). This reaction is conveniently represented in Reaction Scheme B, below, wherein $R^1$ and $R^3$ are as defined above; other substituents being defined in the description pertaining to the Reaction Scheme C, below.

Reaction Scheme B

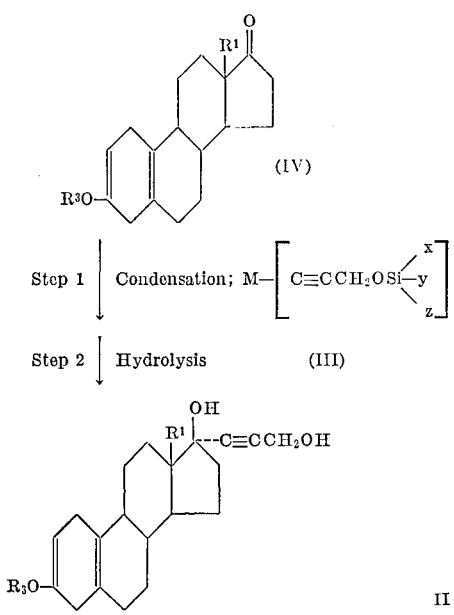

The reaction of the compounds of Formulae III and IV (step 1) may be carried out at a temperature of from about −80° to +60° C. and preferably from about −50 to +20° C. in an anhydrous aprotic solvent suitable for reactions involving an organo metallic reagent, e.g., tetrahydrofuran. The hydrolysis of the reaction product may be carried out in the manner conventionally used in hydrolyzing Grignard adducts, for example, in a nearly neutral medium, e.g., by water or a highly concentrated aqueous solution of sodium chloride or where the hydroxide of M is difficult to handle, e.g., gelatinous, it is preferred to carry out the hydrolysis under slightly acid conditions, so as to prevent hydroxide formation.

Compound III may be obtained by a procedure involving condensing (step I) propargyl alcohol with a halo-trialkylsilane (a compound VII) to form the corresponding trialkylsilyl ether of propargyl alcohol, i.e. a compound VI, which upon treatment with a strong base, i.e. a compound V, forms the corresponding compound III. The preparation of a compound III may conveniently be represented by the following Reaction Scheme C, wherein Q represents a halogen atom having an atomic weight of from 35 to 127, i.e. a chlorine or bromine or iodine atom; each of $x$, $y$ and $z$ is, independently, lower alkyl, e.g., having from 1 to 4 carbon atoms, e.g., methyl, ethyl, propyl or butyl; A is hydrocarbon, such as alkyl, e.g., having from 1 to 8 carbon atoms, preferably n-butyl, or phenyl, or a hydrogen atom; and M is an active metal such as an alkali metal, e.g., lithium, sodium or potassium, magnesium or aluminum; and $n$ is the valence of M:

Reaction Scheme C

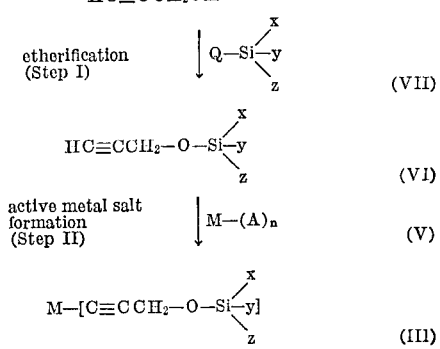

The etherification reaction (step I) is carried out at moderate temperatures, e.g., at from about 0° to 60° C. in the presence of an acid acceptor which is inert under the reaction conditions, e.g., a tertiary amine, such as pyridine or triethylamine. A inert organic solvent may be used, but is not essential as the acid acceptor may serve as solvent. The ether product (compound VI) is recovered from the reaction mixture by conventional means, e.g., by extraction with an organic solvent. During the reaction and recovery phases of steps I and II exposure to moisture should be minimized as the reaction products and certain of the reactants are reactive with proton-contributing compounds, such as water. Preferably a compound VII is used wherein Q is a chloride atom and $x$, $y$ and $z$ are the same, e.g., methyl.

The reaction of the ether (compound VI) with a strong base (V) to form the metal salt of that ether (compound III) is carried out at reduced temperatures, e.g., from −80° to 0° C. in the presence of an inert organic solvent such as is conventionally used with Grignard reagents, e.g., tetrahydrofuran (THF) or diethyl ether. Preferably, the reaction is carried out under an inert dry gas, e.g., nitrogen gas. Caution is exercised in carrying out the reaction as various compounds V, e.g., lithium alkyls, can ignite upon exposure to the air and are therefore conventionally handled in a suitable inert medium, e.g., a paraffin such as hexane. As the reaction product (III) is hydrolyzed by moisture, it is preferably not recovered from the reaction mixture in which it is prepared, but the entire solution thereof is used, as such, in preparing compounds II. Suitable compounds V include n-butyl-lithium, phenyllithium and sodium hydride.

Propargyl alcohol, and compounds IV, V and VII are known and are available by known procedures, or where not known, are available by procedures analogous to known procedures. Many of these compounds are commercially available.

The compounds I are useful because they possess pharmacological activity in animals. In particular, compounds I are useful as estrogenic agents, as indicated by observing increase in white mouse uterine weight, e.g., as described in Endocrinology 65, 265 (1959).

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.1 milligram to 30 milligrams. This daily dosage may be given in a single dose or divided doses, e.g., 2 times a day, or in sustained release form, independent of body weight. Dosage forms suitable for internal administration comprise from about 0.05 milligram to about 30 milligrams of the compound in admixture with a solid or liquid pharmaceutical carrier or diluent.

A representative formulation suitable for oral administration is a tablet prepared by standard tabletting techniques which contains the following.

| Ingredient: | Parts by weight |
|---|---|
| 17β-hydroxy - 17α - (3'-hydroxypropynyl)-estra-5(10)-en-3-one | 0.5 |
| Tragacanth | 2 |
| Lactose | 89 |
| Corn starch | 5 |
| Talcum | 3 |
| Magnesium stearate | 0.5 |

The following examples are presented as illustrative of the invention; all temperatures being centigrade and room temperature being 20° to 30° C., unless indicated otherwise.

EXAMPLE 1

17β-hydroxy-17α-(3'-hydroxypropynyl)-estra-5(10)-en-3-one

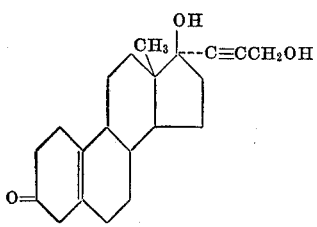

Step A: Trimethylsilyl ether of propargyl alcohol

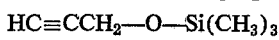

A mixture of 56 g. of propargyl alcohol and 79 g. of pyridine is prepared. 108.5 g. of trimethyl chlorosilane is added to the mixture with stirring and cooling to maintain the temperature of the resultant reaction mixture below about 35°. The hydrochloride salt of pyridine appears as a precipitate. The reaction mixture is then allowed to stand for 1½ hours at about 25° to 30°. 300 ml. of pentane is added, with stirring to the reaction mixture. The solids of the reaction mixture are filtered off and then rapidly (so as to minimize exposure to moisture) washed with 200 ml. of pentane; the pentane wash being then combined with the pentane mother liquor. The combined pentane solutions are then distilled (at atmospheric pressure) to first remove the pentane solvent and then distill over and collect the trimethylsilyl ether of propargyl alcohol (having a boiling point of 111°); caution being exercised to protect the product from moisture during the preparation and recovery steps.

Step B: Lithium-trimethylsilyl ether of propargyl alcohol

In a vessel under dry nitrogen gas 140 ml. of absolute tetrahydrofuran (THF) is cooled to about −78°, by an external bath. 80 ml. of 1.6 molar n-butyl lithium in n-hexane is then added by syringe, and then over a period of 5 minutes, 17.52 g. of the trimethyl silyl ether of propargyl alcohol is added by syringe. The external bath is then allowed to warm to about −50° (in about 10 minutes) and is then reduced in temperature to about −78°. The thus-prepared cooled lithium-trimethylsilyl ether of propargyl alcohol is held for use in Step C, below.

Step C: 17α-(3'-hydroxypropynyl)-3-methoxy-estra-17β-ol

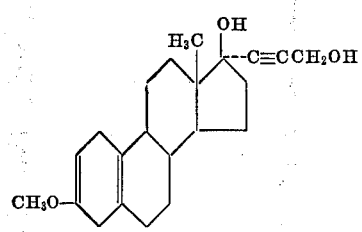

4 g. of 3-methoxy-estra 1,5(10)-dien-17-one in 40 ml. of absolute THF is then added in four portions to the cooled reaction mixture obtained in Step B, above. The resultant mixture is then allowed to warm to about +15° over a period of about 3 hours. The reaction mixture is then cooled to −25° and 7.68 g. of glacial acetic acid added thereto, dropwise. 100 ml. of aqueous sodium chloride solution (near saturation) is then added thereto and the resultant mixture stirred for ½ hour at 0° to 20°. The organic phase is then separated, filtered through a cotton plug and then evaporated under vacuum to obtain 17α-(3'-hydroxypropynyl)-3-methoxy-estra-17β-ol as a residue, which is then refluxed by dissolving in a minimum amount of chloroform (about 10 ml.), then adding benzene thereto (about 10 ml.) to obtain 17α-(3'-hydroxypropynyl)-3-methoxy-estra-17β-ol, M.P. (185) 196–199°.

Step D: 17β-hydroxy-17α-hydroxypropynyl-estra-5(10)-en-3-one 500 mg. of 17α-(3'-hydroxypropynyl)-3-methoxy-estra-17β-ol (refined product, obtained as described in Step C, above) is suspended in 40 ml. of methanol, and mixed with 800 mg. of oxalic acid in 8 ml. of water, with stirring. Within 10 minutes the mixture becomes clear, and sufficient aqueous sodium bicarbonate is added thereto to neutralize the mixture. The mixture is evaporated under vacuum to remove the methanol and 250 ml. of water is then added, causing precipitation of 17β-hydroxy-17α-hydroxypropynyl-estra-5(10)-en-3-one, which is recovered by filtration, M.P. 135–140°.

The title product, so obtained, is refined by recrystallizing by dissolving in a minimum amount of acetone (without heating) and an equal amount of n-heptane added thereto, M.P. 138–140°.

EXAMPLE 2

17β-hydroxy-17α-(3'-hydroxypropynyl)-estra-4-en-3-one

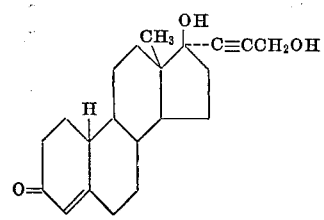

500 mg. of 17α-(3'-hydroxypropynyl)-3-methoxy-estra-2,5(10)-dien-17β-ol in 20 ml. of methanol is mixed with 800 mg. of oxalic acid in 4 ml. methanol, the resulting mixture stirred until homogeneous, then allowed to stand for 2 days at room temperature. The reaction mixture is then evaporated under vacuum to remove methanol. It it then extracted with chloroform. The chloroform extract is then evaporated under vacuum to remove solvent, to obtain 17β - hydroxy - 17α-(3'-hydroxypropynyl)-estra-4-en-3-one as a residue, which is then recrystallized from acetone, M.P. (217) 224–226°.

What is claimed is:

1. A compound of the formula

wherein $R^1$ is alkyl having from 1 to 3 carbon atoms.

2. The compound of claim 1 which is 17β-hydroxy-17α-(3'-hydroxypropynyl)-estra-5(10)-en-3-one.

3. A process for the preparation of a compound of the formula

wherein $R^1$ is alkyl having from 1 to 3 carbon atoms; and $R^3$ is lower alkyl, comprising:

(a) reacting a steroidal compound of the formula

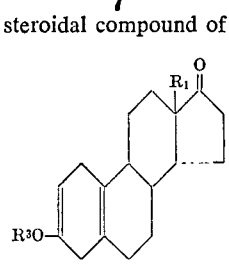

wherein $R^1$ and $R^3$ are as defined above;
with a reagent of the formula

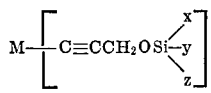

wherein M is an alkali metal, and each of $x$, $y$ and $z$ is, independently, lower alkyl,
at a temperature of from −80° to +60° C. in an anhydrous aprotic solvent, and (b) hydrolyzing the resultant reaction product.

4. A process according to claim 3 wherein M is lithium.

5. A process according to claim 4 wherein the reaction temperature is from −50 to +20° C.

6. A process according to claim 3 wherein each of $R^1$, $R^3$, $x$, $y$ and $z$ is methyl.

References Cited
UNITED STATES PATENTS 3,029,261  4/1962  Kincl _____ 260—397.4

FOREIGN PATENTS 843,155  8/1960  Great Britain _____ 260—239.57

HENRY A. FRENCH, Primary Examiner

U.S. Cl. X.R.

260—397.5, 448.8 R; 424—243